Oct. 24, 1950 D. MITCHELL 2,527,145

MAGNETIC RECORDER AND TRANSMITTER

Filed Dec. 6, 1946 2 Sheets-Sheet 1

INVENTOR
D. MITCHELL
BY R. Marino
ATTORNEY

MAGNETIC RECORDER AND TRANSMITTER

Filed Dec. 6, 1946 2 Sheets-Sheet 2

INVENTOR
D. MITCHELL
BY R. Marino
ATTORNEY

Patented Oct. 24, 1950

2,527,145

UNITED STATES PATENT OFFICE 2,527,145

MAGNETIC RECORDER AND TRANSMITTER

Doren Mitchell, Martinsville, N. J., assignor to Bell Telephone Laboratories, Incorporated, New York, N. Y., a corporation of New York Application December 6, 1946, Serial No. 714,477

7 Claims. (Cl. 179—6)

This invention pertains to magnetic tape recorders and particularly to devices of this type in which incoming messages are recorded on a magnetic tape and then retransmitted over telephone or other transmission lines. In such systems, messages may come in which no line is available for transmission.

An object of the invention, therefore, is to provide a means whereby such messages will be recorded and stored until a line does become available.

Another object of the invention is to ensure the transmission, when a line is available, of the whole of a recorded message.

The invention will be more clearly understood from the following description, the appended claims, and the attached drawings in which:

Figure 1:
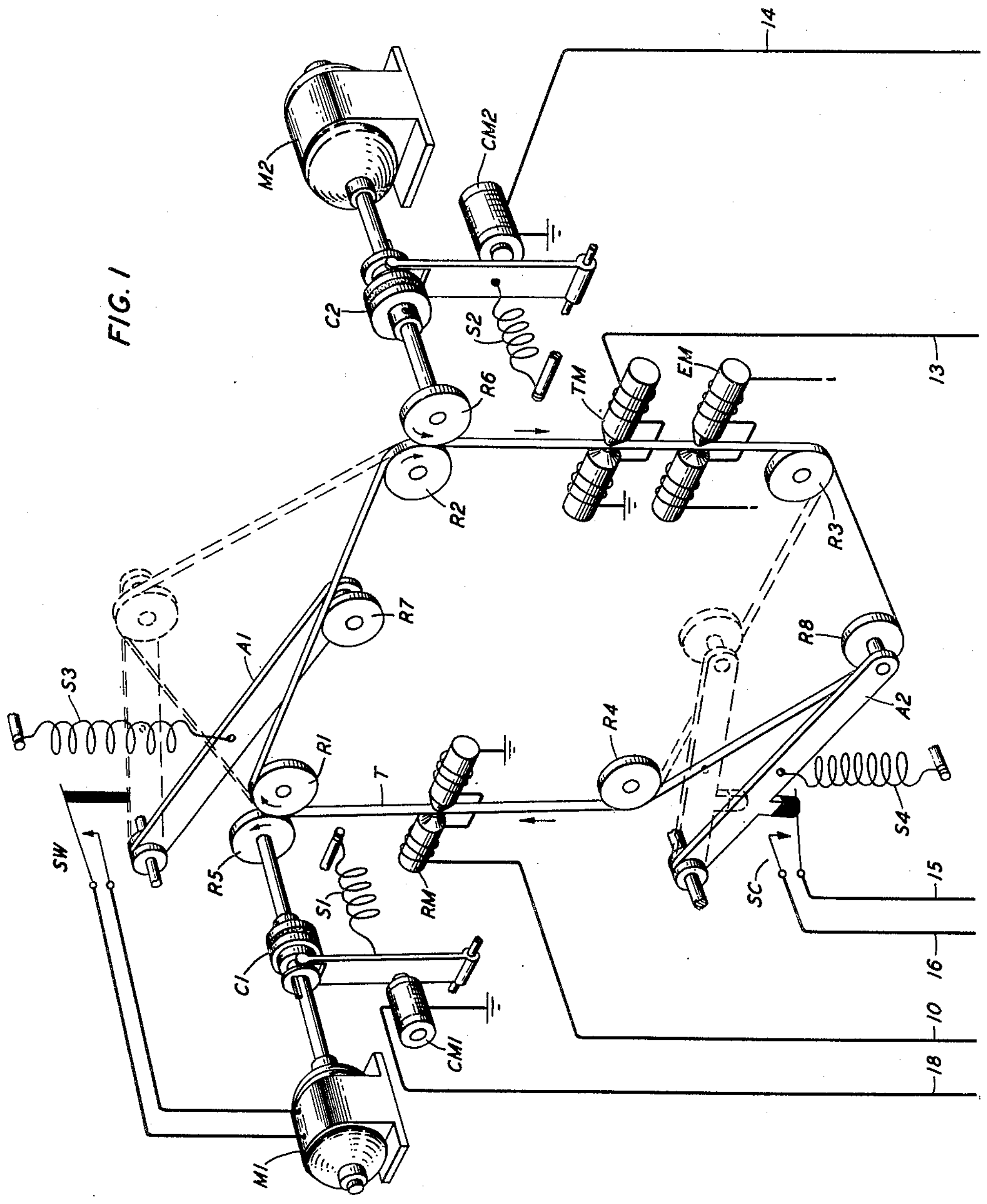
Fig. 1 represents a magnetic-tape recorder.

The magnetic tape recorder shown diagrammatically in Fig. 1 has an endless band of magnetic tape T passing over rollers R1, R2, R3 and R4 and through the gaps of a recording magnet RM, a transmitting magnet TM and an erasing magnet EM. The tape is arranged to be driven past the recording magnet RM by the roller R5 for recording incoming messages and past the transmitting magnet TM and the erasing magnet EM (the latter magnet operated in any suitable manner) by the roller R6 for transmitting recorded messages and then erasing the record from the tape. Roller R5 is driven by motor M1 through the medium of clutch C1 engaged by spring S1 and adapted to be disengaged by magnet CM1. Roller R6 is similarly driven by motor M2 through clutch C2 engaged by spring S2 and adapted to be disengaged by magnet CM2. The two motors run at the same speed so that when clutches C1 and C2 are engaged, the speed of the tape is the same throughout its length. An arm A1 with a roller R7 engaging the upper part of the tape T is actuated by spring S3 so that it draws up any slack in the upper part of the tape, while another arm A2 with roller R8 engaging the lower part of the tape and actuated by spring S4 similarly takes up any slack in the lower part of the tape T. When in its lowest position, arm A2 holds open the contacts SC, which close when said arm rises a short distance. Contacts SW, on the other hand, are opened only when arm A1 rises to nearly its highest position, as indicated in Fig. 1.

Figure 2:
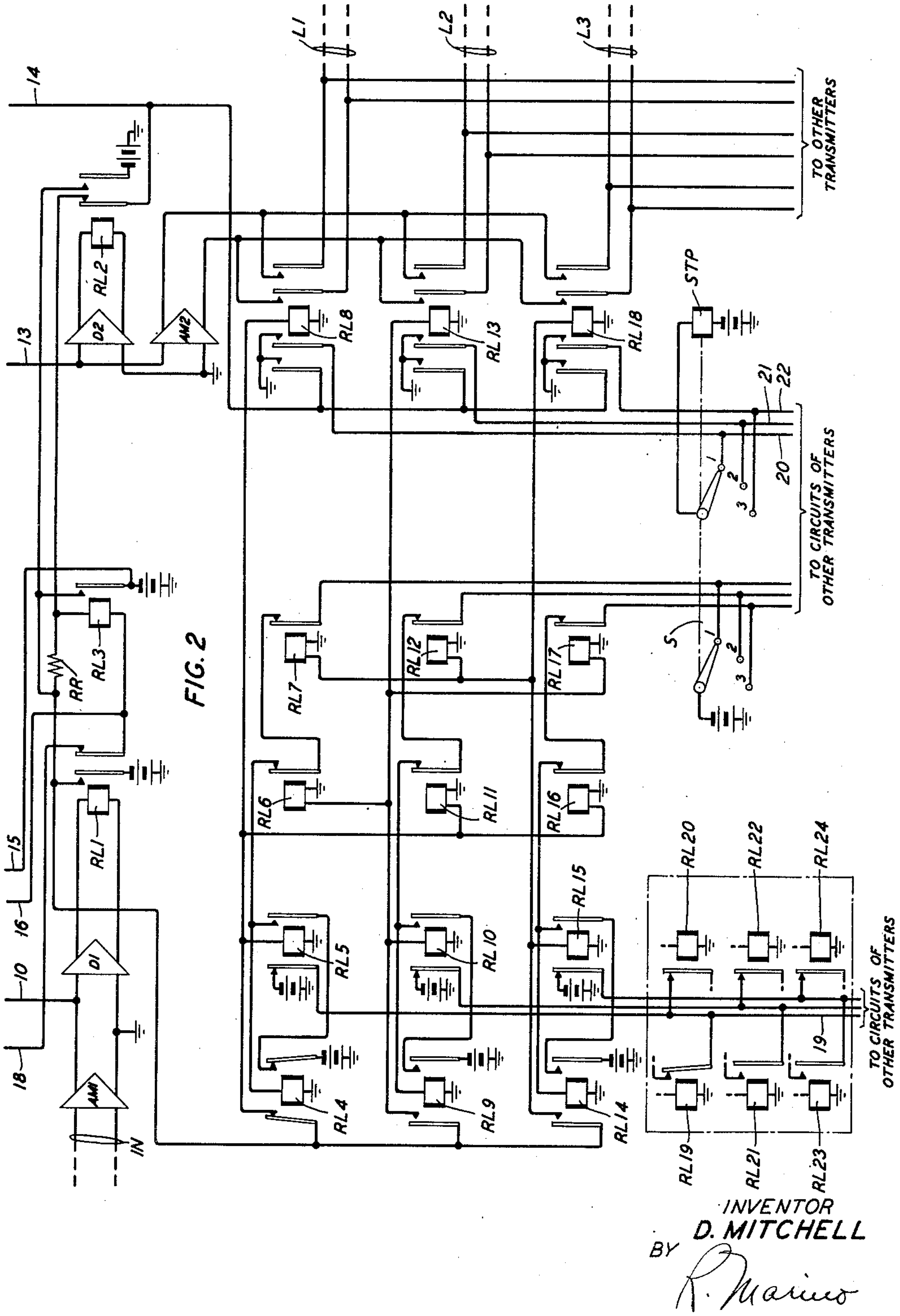
Fig. 2 shows the electrical circuits for associating the recorder with the transmission lines and for controlling the recorder.

Referring to Fig. 2, incoming signals are received over line IN, amplified in any suitable amplifier AM1 and transmitted over conductor 10 to recording magnet RM for recording on tape T. The amplified signals are also transmitted to any suitable detector-amplifier D1 and are sufficiently amplified therein to operate relay RL1. Signals picked up from tape T by transmitting magnet TM are transmitted over conductor 13 and amplified by amplifier AM2 for transmission over one of the lines L1, L2, or L3. Said lines may also be available to other means of transmission and may be multipled, if desired, so that transmission of the recorded message takes place over two or more lines simultaneously. The signals from transmitting magnet TM are also amplified in detector-amplifier D2 sufficiently to operate relay RL2. Relays RL1 and RL2, together with relay RL3, control the operation of the recorder while line L1, L2, or L3 is selected and connected, for transmission of the recorded signals, by the remainder of the circuits shown in Fig. 2.

When no messages are recorded on tape T and no signals are being received over line IN, then, as will be shown later, arms A1 and A2 are in their lowest positions, clutches C1 and C2 are engaged by springs S1 and S2, respectively, and rollers R5 and R6 are driven by motors M1 and M2, respectively. Tape T is, therefore, driven continuously at the same speed throughout its length. If, now, signals are received over line IN, they are amplified in amplifier AM1 and recorded on tape T by recording magnet RM. They are also further amplified in detector-amplifier D1 causing the operation of relay RL1. If a line, for example, line L1, is available for transmission of the recorded signals, the two arms of selector S, which are mechanically coupled together, will be resting on the No. 1 terminals of said selector as shown in Fig. 2 and described later. Relay RL4 will then be operated over a circuit extending from battery through the left-hand arm and No. 1 terminal of selector S, contacts of relay RL7, contacts of relay RL6, and winding of relay RL4 to ground. Relays RL5, RL8, RL11 and RL16 then operate over a circuit extending from battery through front contacts of relay RL1, left contacts of relay RL4, and windings of relays RL5, RL8, RL11 and RL16 in parallel to ground. Relay RL5, through its right contacts completes an obvious locking circuit for relay RL4. The left inner contacts of relay RL8 complete a circuit from battery through the winding of the stepping magnet STP of selector S and right-hand arm and No. 1 terminals of said selector to ground on said left inner contacts of relay RL8, operating said stepping magnet, which moves the arms of selector S to the No. 2 terminals, thereby opening the circuit of and releasing said stepping magnet. The right contacts of relay RL8 connect line L1 to amplifier AM2. Signals picked up from tape T by transmitting magnet TM are amplified in amplifier AM2 and transmitted through contacts of relay RL8 to line L1. They are also amplified in detector-amplifier D2 and cause the operation of relay RL2. A circuit is thereby completed from battery through the outer contacts of relay RL2, left contacts of relay RL4, windings of relays RL5, RL8, RL11 and RL16 in parallel to ground, holding relays RL5 and RL8 operated. The left outer contacts of relay RL8 short-circuit the winding of clutch magnet CM2 thus preventing the operation of said magnet as long as line L1 is held.

If signals cease to come in on line IN, relay RL1 is released but, relays RL5 and RL8 being held operated over the circuit traced above, and relay RL4 being thereby held operated through its previously described locking circuit, rollers R5 and R6 continue to drive tape T so long as signals are picked up by transmitting magnet TM, and said signals are transmitted to line L1. The whole of any message recorded on tape T is, therefore, transmitted to line L1.

By the operation of relay RL2, as described above, a circuit is also completed from battery through the outer contacts of said relay, left contacts of relay RL4, and windings of relays RL11 and RL16 in parallel to ground, operating the latter relays. This prevents the operation of relays RL9 and RL14, thereby preventing the operation of relays RL13 and RL18, so that lines L2 and L3 cannot be connected to amplifier AM2 while line L1 is so connected. Furthermore, the left contacts of relay RL5 disconnect battery from the contacts of relay RL19 and RL20 which are part of similar circuits of another means of transmission to lines L1, L2, and L3, said relays corresponding to relays RL4 and RL5 and likewise associated with line L1. Said other means of transmission is thereby prevented from seizing line L1 while said line is connected to amplifier AM2. If there are still other means of transmission having access to line L1, they are provided with relays similar to relays RL19 and RL20 which normally receive battery over conductor 19. By the operation of relay RL5, said transmitting means are deprived of battery over conductor 19 and are thereby similarly prevented from seizing line L1. If line L2, instead of line L1, is connected to amplifier AM2, operation of relays RL6 and RL17 will, in a similar manner, prevent the connection of lines L1 and L3 to said amplifier while the operation of relay RL10 will prevent said other means of transmission from seizing line L2. Similarly, if line L3 is connected to amplifier AM2, operation, in a similar manner, of relays RL7 and RL12 prevents connection of lines L1 and L2 to said amplifier while the operation of relay RL15 prevents seizure of line L3 by other means of transmission.

Assuming, now, that signals are being received over line IN and are being recorded on tape T, as described above, but none of the lines L1, L2 and L3 is available for transmission of said signals, all of said lines being in use by other means of transmission. Under these circumstances, each of conductors 20, 21, and 22 is grounded in said other means of transmission. Stepping magnet STP will then be energized repeatedly as it moves the arms of selector S to successive terminals of said selector and said arms will not come to rest on any terminals long enough to operate relays RL4, RL9 and RL14. No line is, therefore, connected to amplifier AM2. A circuit is, however, completed from battery through inner contacts of relay RL1 (operated by amplified signals from detector-amplifier D1) resistance RR, inner contacts of relay RL2, conductor 14, and the winding of clutch magnet CM2, energizing said clutch magnet which disengages clutch C2. Roller R6, therefore, stops and roller R5 continuing to be driven by motor M1, slack accumulates in tape T which is drawn upward by arm A1, as indicated by the dotted lines in Fig. 1. Arm A2 also rises correspondingly, allowing contacts SC to close. A circuit is now completed from battery over conductor 15, through contacts SC, conductor 16, winding of relay RL3, inner contacts of relay RL2, conductor 14, and winding of clutch magnet CM2 to ground, over which relay RL3 operates, connecting resistance RR in parallel with the winding of said relay, which maintains clutch magnet CM2 energized. Incoming signals over line IN are recorded on tape T and the portion of said tape on which said signals are recorded is stored in a loop supported by arm A1. There is obviously no limitation to the length of tape T, which can be made long enough to accommodate the signals received before a line becomes available under normal circumstances. However, contacts SW are provided which are opened by arm A1 in its highest position to cut-off power to motor M1 in case of failure of the selecting circuits to connect a line for transmission before arms A1 and A2 reach their limiting positions. Under these circumstances no further signals are recorded on tape T until a line has been selected and a part of the recorded signals transmitted.

When a line, for example, line L2, does become available for transmission of the stored signals, the arms of selector S come to rest on the No. 2 terminals, no ground being found on conductor 21 to operate stepping magnet STP. Relay RL9 then operates over a circuit extending from battery through the left arm and No. 2 terminal of selector S, contacts of relay RL12, contacts of relay RL11, and winding of relay RL9 to ground. Relay RL9 operates and completes a circuit from battery through inner contacts of relay RL1, left contacts of relay RL9, and windings of relays RL6, RL17, RL10 and RL13 in parallel to ground, over which the latter relays operate. Relays RL6 and RL17 open the operating circuits of and prevent the operation of relays RL4 and RL14, respectively. Relay RL13 connects line L2 to amplifier AM2. The winding of clutch magnet CM2 is now short-circuited by the path from conductor 14 to ground through left outer contacts of relay RL13, deenergizing said magnet and allowing clutch C2 to engage. Tape T is then driven past transmitting magnet TM by roller R6. Signals picked up from tape T by transmitting magnet TM are amplified by amplifier AM2 and transmitted to line L2. Said signals are also amplified in detector-amplifier D2 causing the operation of relay RL2. The outer contacts of said relay apply battery through the left contacts of relay RL9 to the windings of relays RL10, RL13, RL6, and RL17 to maintain line L2 connected to amplifier AM2 and to prevent interference in the manner already described.

After a line has become available for transmission, therefore, and signals continue to be received over line IN, rollers R5 and R6 continue to be driven by motors M1 and M2, respectively, and, both rollers running at the same speed, the loop in tape T supported by arm A1 remains.

When signals cease to come in over line IN, relay RL1 is no longer energized and releases. A circuit is thereby completed from battery over conductor 15, through contacts SC, conductor 16, outer contacts of relay RL1, conductor 18, and winding of clutch magnet CM1 to ground, energizing said magnet which disengages clutch C1. Roller R5, therefore, stops and roller R6, continuing to be driven, the loop in tape T supported by arm A1 is drawn out, depressing arm A1. Arm A2 falls correspondingly until, when tape T has returned to its normal position, contacts SC are opened by said arm. The circuit of clutch magnet CM1 is thereby opened, deenergizing said magnet and allowing clutch C1 to engage. Roller R5 is now driven by motor M1, roller R6 continuing to be driven by motor M2. When the entire message recorded on tape T has been transmitted to line L2, relay RL2 is no longer energized by transmitted signals and releases, in turn, releasing relays RL13, RL17, RL6, and RL10. Release of relay RL10 releases relay RL9 and release of relay RL13 disconnects line L2 from amplifier AM2.

The mechanism is now in the originally-assumed condition of no signals being received over line IN and no messages recorded on tape T. Rollers R5 and R6 are driven by motors M1 and M2, respectively, and arms A1 and A2 are in their lowest positions.

In the present embodiment of the invention, tape T is an endless band. It is obvious, however, that the application of the invention is not limited to a continuous tape, since the invention will operate and satisfactorily perform its functions if contacts SC are arranged to be closed by arm A1 when in its lowest position and to be otherwise open. Arm A2 may then be omitted and a non-continuous tape may be used.

What is claimed is:

1. A signal recording and transmitting device, comprising a magnetic tape, means for recording signals on said tape, means for transmitting said recorded signals from said tape, a recording drive for said tape, a transmitting drive for said tape, means for actuating said recording drive, and means for causing said last-mentioned means to be responsive to signals to be recorded when said transmitting drive is arrested.

2. A signal recording and transmitting device comprising in combination an endless magnetic tape, a recording drive and a transmitting drive upon which said tape is slackably supported, means for recording incoming signals on said tape, means for transmitting said recorded signals from said tape, means for controlling said recording drive, and means responsive to a predetermined position by a portion of said tape between said drives for operating said last-mentioned means thereby to arrest the movement of said recording drive.

3. A signal recording and transmitting device comprising in combination an endless magnetic tape, a recording drive and transmitting drive upon which said tape is slackably supported, means for recording incoming signals on said tape and means responsive to said signals, means for transmitting said recorded signals from said tape, individual means for controlling each of said drives, means responsive to incoming signals for operating said transmitting drive control means thereby to arrest the movement of said transmitting drive, and means jointly responsive to a predetermined position by a portion of said tape between said two drives and said signal responsive means for operating said recording drive control means in the absence of incoming signals.

4. In a signaling system, the combination with a plurality of lines and means for selecting one or more of said lines, of a magnetic recording and transmitting device comprising a magnetic tape, means for recording signals on said tape and means responsive to said signals, a recording drive for said tape responsive to the operation of said signal responsive means, means for transmitting said recorded signals from said tape, and a transmitting drive for said tape jointly controlled by said signal responsive means and each of said plurality of lines, whereby said drive is arrested in response to the operation of said signal responsive means and operated in response to one or more of said lines if selected by said line selecting means during the operation of said signal responsive means.

5. In a signaling system, the combination with a group of lines and means for selecting one or more of said lines, of a magnetic recording and transmitting device comprising an endless tape, a recording drive and a transmitting drive upon which said tape is slackably supported, means responsive to signals for operating said recording drive, means responsive to one or more of said lines when selected by said line-selecting means for controlling said transmitting drive, and means responsive to a predetermined position of a portion of said tape between said two drives for arresting said recording drive in the absence of incoming signals.

6. In a signaling system, the combination with a plurality of lines and means for selecting one or more of said lines, of a magnetic recording and transmitting device comprising a magnetic tape, means for recording signals on said tape and means responsive to said signals, a normally operative recording drive including a control means therefor, means for transmitting signals from said tape, a normally operative transmitting drive for said tape including a control means therefor, means jointly responsive to the operation of said signal responsive means and to the busy condition of all of said lines for operating said transmitting drive control means thereby to arrest said transmitting drive, means for supporting said tape in a loop between said two drives when said recording drive is in operation and said transmitting drive is not in operation, and means responsive to said supporting means and to said signal responsive means for actuating said recording drive control means thereby to arrest said recording drive in the absence of incoming signals.

7. In a signaling system, the combination with a plurality of lines and means for selecting one or more of said lines, of a magnetic recording and transmitting drive comprising a magnetic tape, means for recording signals on said tape and means responsive to said signals, a normally operative recording drive for said tape including a control means therefor, means for transmitting signals from said tape, a transmitting drive for said tape including control means therefor, means responsive to the busy condition of all of said lines and to the operation of said signal responsive means for operating said transmitting drive control means thereby to arrest said transmitting drive, means comprising a spring-actuated arm for accumulating the length of tape between said recording drive and said transmitting drive when said recording drive is operating and said transmitting drive is not operating, means including said signal responsive means for operating said recording drive control means in the absence of incoming signals, and means responsive to the selection of one or more of said lines in the absence of incoming signals for releasing said transmitting drive control means thereby to operate said transmitting drive and cause all of the signals recorded on said tape to be transmitted over said selected line or lines.

DOREN MITCHELL.

REFERENCES CITED

The following references are of record in the file of this patent:

UNITED STATES PATENTS

| Number | Name | Date |
|---|---|---|
| 158,927 | Gally | Jan. 19, 1875 |
| 1,202,952 | Adams | Oct. 31, 1916 |
| 1,624,596 | Hartley | Apr. 12, 1927 |
| 2,082,303 | Schiller | June 4, 1933 |